(12) United States Patent
Wang et al.

(10) Patent No.: US 11,099,663 B2
(45) Date of Patent: *Aug. 24, 2021

(54) ELECTRONIC BAG

(71) Applicant: SHENZHEN ROYOLE TECHNOLOGIES CO. LTD., Shenzhen (CN)

(72) Inventors: Chaogang Wang, Guangdong (CN); Fan Yang, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/810,098

(22) Filed: Mar. 5, 2020

(65) Prior Publication Data
US 2020/0201456 A1 Jun. 25, 2020

Related U.S. Application Data

(63) Continuation-in-part of application No. 16/124,581, filed on Sep. 7, 2018, now Pat. No. 10,684,709, which
(Continued)

(30) Foreign Application Priority Data

Dec. 22, 2015 (CN) .......................... 201521077236.1

(51) Int. Cl.
G06F 3/0354 (2013.01)
G06F 1/16 (2006.01)
G06F 3/01 (2006.01)

(52) U.S. Cl.
CPC .......... G06F 3/03547 (2013.01); G06F 1/163 (2013.01); G06F 3/017 (2013.01)

(58) Field of Classification Search
CPC ...... G06F 1/163; G06F 1/1652; G06F 1/1654; G06F 1/169; G06F 3/03547; G06F 3/017;
(Continued)

(56) References Cited

U.S. PATENT DOCUMENTS 7,805,114 B1 9/2010 Quintana
9,223,494 B1 * 12/2015 DeSalvo ............. G06F 3/04883
(Continued)

FOREIGN PATENT DOCUMENTS

CN 202489401 U 10/2012
CN 203105947 U 8/2013
(Continued)

OTHER PUBLICATIONS

Piotr Boruslawski, "brakepack by artefact solves the failed dialogue between cyclists and motorists", May 14, 2015, XP055353625, Retrieved from the Internet: URL: http://www.designboom.com/technology/artefact-brakepack-05-14-2015/.

Primary Examiner — Tom V Sheng
(74) Attorney, Agent, or Firm — Hauptman Ham, LLP

(57) ABSTRACT

An electronic bag is provided. The electronic bag includes a communication unit operable to establish a communication connection between the electronic bag and an electronic device, a touch unit operable to receive a touch gesture on the touch unit, and a processor operable to generate, according to the touch gesture on the touch unit, a control signal for controlling the electronic device. Different functions of the electronic device can be set to be controlled by performing different touch gestures on the touch unit of the electronic bag.

19 Claims, 8 Drawing Sheets

Related U.S. Application Data is a continuation-in-part of application No. 15/361,775, filed on Nov. 28, 2016, now Pat. No. 10,114,413.

(58) Field of Classification Search
CPC ........ G06F 3/041; G06F 3/0488; G06F 3/147; G06F 3/165; G06F 3/167; G06F 1/1692; G06F 2203/04102; A45C 3/00; A45C 3/001; A45C 3/02; A45C 3/03; A45C 3/06; A45C 5/02; A45C 5/03; A45C 13/001; A45C 15/00; A45F 3/02; A45F 3/005; A45F 3/04; A45F 2003/001; A45F 2003/003; G09G 5/003; G09G 5/36; G09G 2354/00; G09G 2370/16; G09G 2380/12
USPC .......................................................... 345/173
See application file for complete search history.

(56) References Cited

U.S. PATENT DOCUMENTS

| | | | | |
|---|---|---|---|---|
| 9,781,243 | B1* | 10/2017 | Huang | H04W 4/50 |
| 10,019,068 | B2* | 7/2018 | Koo | G06F 3/0488 |
| 10,114,413 | B2* | 10/2018 | Yang | G06F 1/163 |
| 10,180,334 | B2* | 1/2019 | Uchimura | B60K 35/00 |
| 10,684,709 | B2* | 6/2020 | Wang | G06F 1/1654 |
| 2007/0199844 | A1* | 8/2007 | Daley | A45C 5/02 |
| | | | | 206/320 |
| 2008/0156606 | A1 | 7/2008 | Entner | |
| 2011/0051349 | A1* | 3/2011 | Daley, III | G06F 1/1662 |
| | | | | 361/679.27 |
| 2011/0283241 | A1 | 11/2011 | Miller et al. | |
| 2013/0298080 | A1 | 11/2013 | Griffin | |
| 2015/0133193 | A1* | 5/2015 | Stotler | G06F 3/0421 |
| | | | | 455/557 |
| 2015/0227164 | A1* | 8/2015 | Laycock | G06F 1/1652 |
| | | | | 345/82 |
| 2015/0279171 | A1 | 10/2015 | Hyde | |
| 2015/0279172 | A1 | 10/2015 | Hyde | |
| 2017/0075481 | A1* | 3/2017 | Chou | G06F 1/163 |
| 2017/0177208 | A1* | 6/2017 | You | G06F 3/0488 |
| 2020/0033966 | A1* | 1/2020 | Lee | G06F 3/0488 |

FOREIGN PATENT DOCUMENTS

| | | |
|---|---|---|
| CN | 204617309 U | 9/2015 |
| CN | 204861731 U | 12/2015 |
| JP | 59-189532 U | 12/1984 |
| JP | 62-40698 U | 3/1987 |
| JP | 7-36607 A | 2/1995 |
| JP | 11-143634 A | 5/1999 |
| JP | 2003-343 A | 1/2003 |
| JP | 2003-84680 A | 3/2003 |
| JP | 2005-18048 A | 1/2005 |
| JP | 3116814 U | 12/2005 |
| JP | 3121960 U | 6/2006 |
| JP | 2011-10766 A | 1/2011 |
| JP | 2011-135525 A | 7/2011 |
| JP | 5531612 B2 | 6/2014 |
| JP | 3194774 U | 12/2014 |
| KR | 2020110011650 U | 12/2011 |
| TW | M486320 U | 9/2014 |
| WO | 2013150665 A | 10/2013 |

* cited by examiner

ELECTRONIC BAG

CROSS REFERENCE TO RELATED APPLICATIONS

This application is a continuation-in-part of U.S. patent application Ser. No. 16/124,581, filed on Sep. 7, 2018, which is a continuation-in-part of U.S. patent application Ser. No. 15/361,775, filed on Nov. 28, 2016, which claims priority to Chinese Patent Application No. 201521077236.1, filed on Dec. 22, 2015, contents of which are hereby incorporated by reference in their entireties.

FIELD OF THE TECHNICAL

The present disclosure relates to wearable devices, and particularly to an electronic bag.

BACKGROUND

In daily life, people often keep different kinds of goods in different kinds of bags. The bags bring convenience to daily life. With the development of living standards, more and more kinds of bags are developed to satisfy user's different needs. However, presently, most kinds of bags just have storage function.

SUMMARY

The present disclosure provides an electronic bag and a wearable equipment.

In a first aspect, an electronic bag is provided. The electronic bag includes a communication unit operable to establish a communication connection between the electronic bag and an electronic device, a touch unit operable to receive a touch gesture on the touch unit, and a processor operable to generate, according to the touch gesture on the touch unit, a control signal for controlling the electronic device.

In a second aspect, a wearable equipment is provided. The wearable equipment includes a main body and a module connected to the main body. The module is operable to establish a communication between the wearable equipment and an electronic device and generate a control signal for controlling the electronic device when receiving a touch gesture.

DETAILED DESCRIPTION OF ILLUSTRATED EMBODIMENTS

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific embodiments disclosed below.

Figure 1:
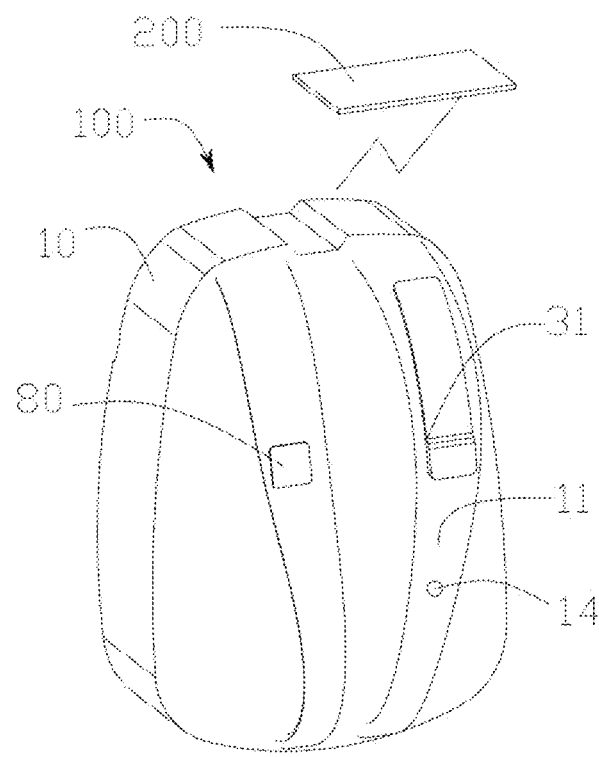
FIG. 1 is a perspective view of an electronic bag in accordance with an embodiment of the present disclosure, illustrating the electronic bag being able to be in communication with an electronic device, and a touch unit and a battery unit being arranged on straps of the electronic bag.
Figure 2:
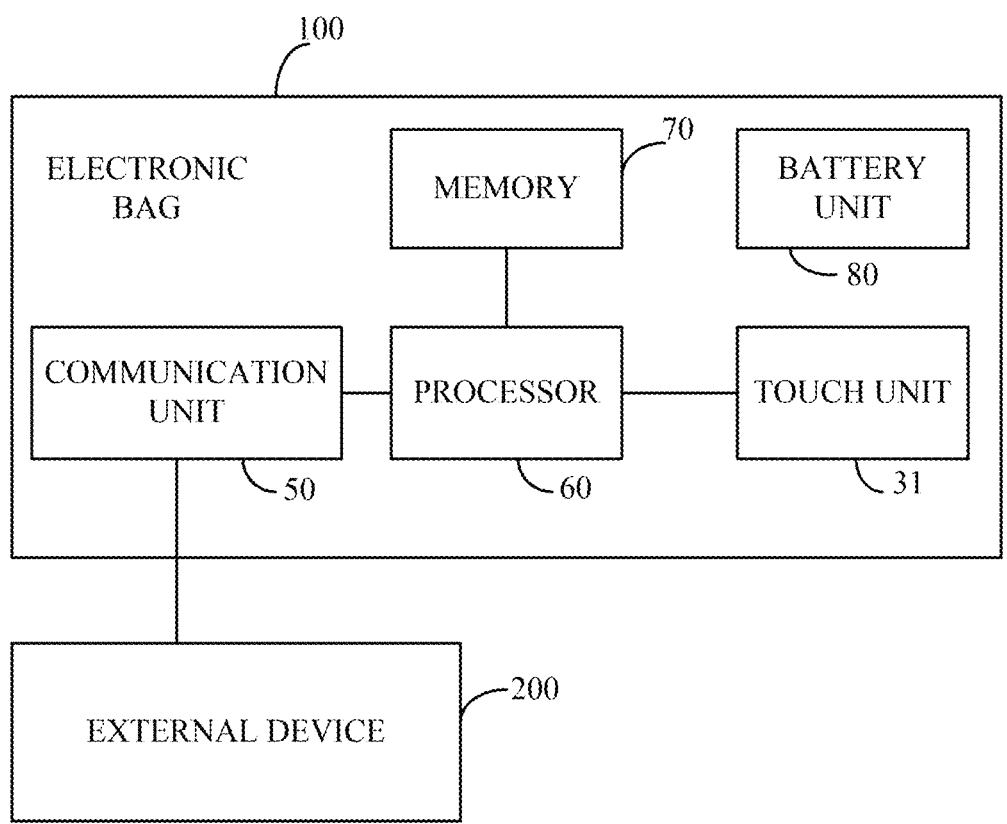
FIG. 2 is a block diagram illustrating the electronic bag of FIG. 1 in accordance with an embodiment of the present disclosure.

Referring to FIGS. 1-2, an electronic bag 100 in accordance with an embodiment of the present disclosure is shown. In the embodiment, the electronic bag 100 is a backpack. In an alternative embodiment, the electronic bag 100 may be a shoulder bag, a waist bag, a brief bag, a hand bag, a messenger bag, or a suitcase.

In the embodiment, the electronic bag 100 includes a communication unit 50, a touch unit 31, and a processor 60. The communication unit 50 may communicate with an electronic device such as an external device or a display of the electronic bag 100. In one embodiment, the communication unit 50 is operable to establish a communication between the electronic bag 100 and an external device 200. The external device 200 may be separated from the electronic bag 100 to be outside the electronic bag 100, or be received in the electronic bag 100. The communication unit 50 may be a wireless or wired communication unit. The touch unit 31 may be a touch pad or a touch display unit with a touch-sensing and display function. The external device 200 may be a smart phone, a person digital assistant (PDA), a computer, a pad, a navigation device or the like. The external device 200 can be put in the electronic bag 100, hold by hands, or put in a bracket connected to a handle of a bike or motorcycle. The touch unit 31 is operable to receive a touch gesture on the touch unit 31. The processor 60 is operable to generate, according to the touch gesture on the touch unit 31, a control signal for controlling the external device 200, that is, when the communication between the electronic bag 100 and the external device 200 is established, different touch gestures on the touch unit 31 of the electronic bag 100 can control the external device 200 to realize various functions, such as adjusting volume, switching songs, switching images, launching or closing an application, switching navigation routes, outputting voice, making or ending a call, and so on. The communication between the electronic bag 100 and the external device 200 may be dual, that is, the electronic bag 100 can send signal to the external device 200, and the external device 200 can also send signal back to the electronic bag 100.

In an implementation, the processor 60 generates the control signal to control the external device 200, according to the touch gesture on the touch unit 31. The external device 200 then performs a corresponding function according to a correspondence between touch gestures and to-be-controlled functions of the external device 200. The external device 200 includes a display, and the control signal can control displayed content on the display. The touch unit 31 is operable to control the display to display a pattern according to a touch gesture performed on the touch unit 31 and a preset correspondence relationship between patterns and touch gestures. Alternatively, the touch unit 31 or the processor 60 is operable to select a pattern stored in the electronic bag 100 or the external device 200 beforehand according to a touch gesture performed on the touch unit 31 and control the display to display the selected pattern. In an embodiment, the correspondence can be stored in a memory 70 of the electronic bag 100 in advance. The processor 60 generates the control signal according to the touch gesture and the correspondence between touch gestures and to-be-controlled functions of the external device 200, and then sends the control signal to another processor of the external device 200 through the communication unit 50. The another processor executes the control signal to control the external device 200 to perform the corresponding function. Alternatively, the correspondence between touch gestures and to-be-controlled functions of the external device 200 may be divided into two parts: a correspondence between gestures and control signals generated by the processor 60, and a correspondence between control signals generated by the processor 60 and to-be-controlled functions of the external device 200. The correspondence between gestures and control signals generated by the processor 60 may be stored in the memory 70 of the electronic bag 100, and the correspondence between control signals and to-be-controlled functions of the external device 200 may be stored in a memory of the external device 200 in advance. The processor 60 generates and sends the control signal to the another processor of the external device 200, according to the correspondence between gestures and control signals generated by the processor 60. The another processor generates a further control signal to control the external device 200 to perform the corresponding function, according to the correspondence between control signals and to-be-controlled functions of the external device 200. In brief, each touch gesture corresponds to a to-be-controlled function of the external device 200. For example, when a user draws a circle on the touch unit 31, a target application of the external device 200 such as a navigation application or a personal assistant of the external device 200 is launched; when within a preset time period such as 1 second the user draws two vertical lines on the touch unit 31, the volume of the external device 200 is adjusted such as the volume of the external device 200 is decreased or increased; when within a preset time period the user taps twice on the touch unit 31, a camera function of the external device 200 is activated. Many functions of the external device 200 can be set to be controlled by the electronic bag 100, and the present disclosure is not limited to the above examples.

In an implementation, the processor 60 generates, according to the touch gesture on the touch unit 31 and a currently running application of the external device 200, the control signal to control the external device 200. In this implementation, the processor 60 determines the currently running application of the external device 200 via a bidirectional communication between the electronic bag 100 and the external device 200. For example, the processor 60 of the electronic bag 100 can be triggered to transmit a query instruction to the external device 200, and the external device 200 then returns an indication indicative of the currently running application or installed application of the external device 200 upon receipt of the query instruction. The processor 60 can be triggered to transmit the query instruction upon detecting a preset touch gesture such as drawing a shape of "C" on the touch unit 31. Alternatively, the external device 200 can actively inform the electronic bag 100 of the currently running application or installed application of the external device 200 as soon as the electronic bag 100 is communicated with the external device 200. Alternatively, when an application of the external device 200 is launched, the external device 200 transmits the indication indicative of the currently running application to the electronic bag 100. When the processor 60 determines the currently running application of the external device 200, the processor 60 can generate a corresponding control signal to control the external device 200 in response to the touch gesture on the touch unit 31. For example, if the currently running application of the external device 200 is the navigation application, sliding from right to left on the touch unit 31 is used to control the external device 200 to switch navigation routes; if the currently running application of the external device 200 is a music playing application, sliding upwardly on the touch unit 31 is used to switch to the next song; if the currently running application of the external device 200 is a chatting application, a long press on the touch unit 31 such as pressing on the touch unit 31 for 2 seconds is used to activate a voice input function of the chatting application, that is, the user can speak and then a voice message is generated by the external device 200 and sent to the other person who is chatting with the user via the chatting application. Many functions of the external device 200 can be set to be controlled by the electronic bag 100, and the present disclosure is not limited to the above examples.

In an embodiment, the communication unit 50, the processor 60, and the memory 70 may be integrated in the touch unit 31, that is, a touch device having various components such as the communication unit 50, the processor 60, and the memory 70 may be provided. The touch unit 31 may be a resistive touch unit, a capacitive touch unit, an infrared touch unit, or a surface acoustic wave touch unit.

In an embodiment, the electronic bag 100 may further include a battery unit 80. The battery unit 80 is operable to supply power to various components of the electronic bag 100, such as the touch unit 31, the communication unit 50, the processor 60, and the memory 70. Alternatively, the communication unit 50, the processor 60, and the memory 70 may be integrated in the battery unit 80.

Figure 10:
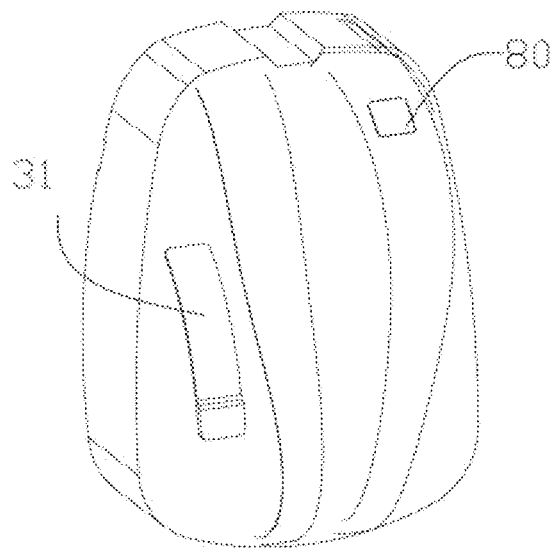
FIG. 10 is a perspective view of an electronic bag in accordance with still another embodiment of the present disclosure, illustrating a touch unit being arranged on a back surface of the electronic bag and a battery unit being arranged on a strap of the electronic bag.

The electronic bag 100 further includes a main body which includes a bag body 10 equipped with two straps 11. The touch unit 31 may be detachably connected to one strap 11, and the battery unit 80 may be detachably connected to the other strap 11. Certainly, the touch unit 31 and the battery unit 80 can be detachably connected to other positions of the electronic bag 100. For example, as illustrated in FIG. 10, the touch unit 31 is detachably connected to a back surface of the electronic bag 100, and the battery unit 80 is detachably connected to one strap of the electronic bag 100. It is to be understood that the separated touch unit 31 can be detachably attached to any position of the electronic bag 100 according to requirements, for example, a bottom surface of the electronic bag 100, a top surface of the electronic bag 100, a side surface of the electronic bag 100, or even interior of the electronic bag 100. For example, a user may move the touch unit 13 from the strap 11 to the side surface of the electronic bag 100, for facilitating operations thereof. The touch unit 31 may also be provided with an independent power source, such that when the touch unit 31 is separated from the main body 10, the touch unit 31 can work normally. When the battery unit 80 is separated from the main body 10, the battery unit 80 can be recharged conveniently.

Figure 3:
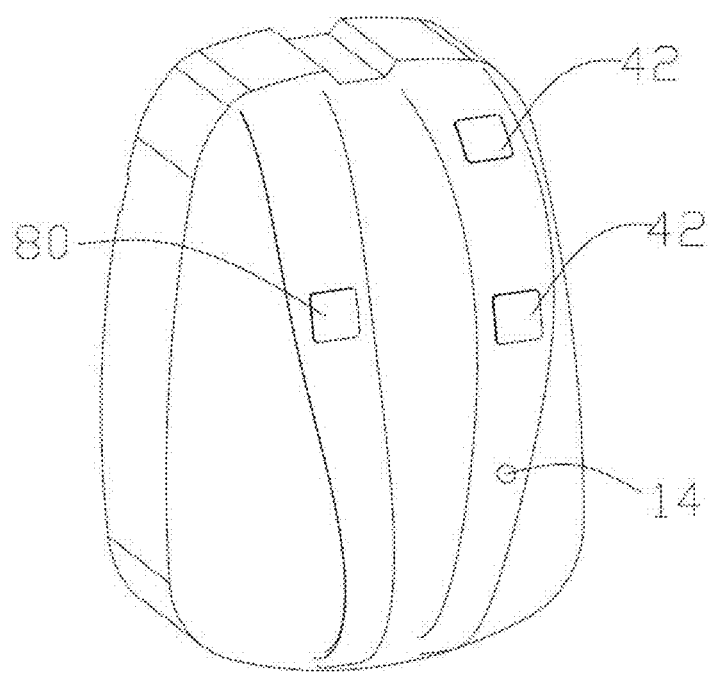
FIG. 3 is similar to FIG. 1, illustrating the strap of the electronic bag being provided with first magic tapes, with the touch unit being removed for clarity.
Figure 4:
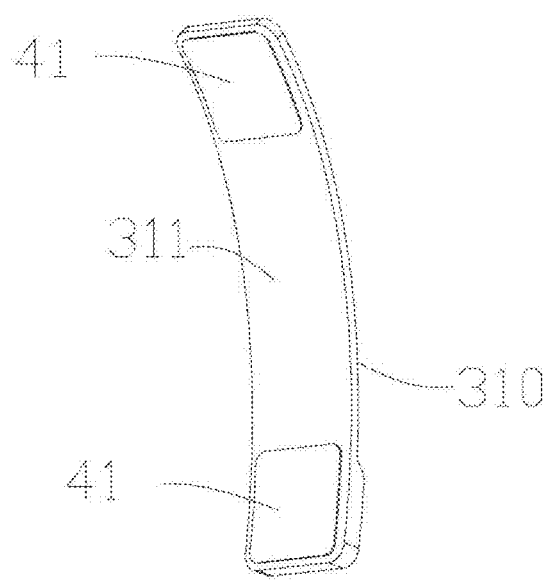
FIG. 4 is a perspective view of the touch unit of FIG. 1, illustrating the touch unit being provided with second magic tapes.

As illustrated in FIGS. 3-4, the touch unit 31 is detachably connected to the strap 11 via connection portions such as magic tapes. The touch unit 31 has a first surface 310 and a second surface 311 opposite the first surface 310. The first surface 310 is operable to allow an object to touch the first surface 310. The object may be a user finger, a stylus pen or the like. The second surface 311 is provided with first connection portions 41. The strap 11 is also provided with second connection portions 42. The arrangement of the first connection portions 41 on the second surface 311 is adapted to that of the second connection portions 42 on the strap 11, such that the touch unit 31 can be detachably connected to the strap 11 via the first and second connection portions 41 and 42. Besides the magic tapes, the first connection portions 41 may also be first magnets, and the second connection portions 42 may be second magnets which can attract the first magnets. Particularly, the two first connection portions 41 of the touch unit 31 may also be detachably connected to each other, so that the touch unit 31 may be bent to a ring and keep the ring shape by attaching the two first connection portions 41 with each other. Alternatively, the touch unit 31 may be bent to maintain the ring shape without any connection portions of the touch unit 31 but through the rigidity of the touch unit 31. After the touch unit 31 is bent, the ring shape can be worn on the handle of the bike or motorcycle or the wrist of a user.

Figure 5:
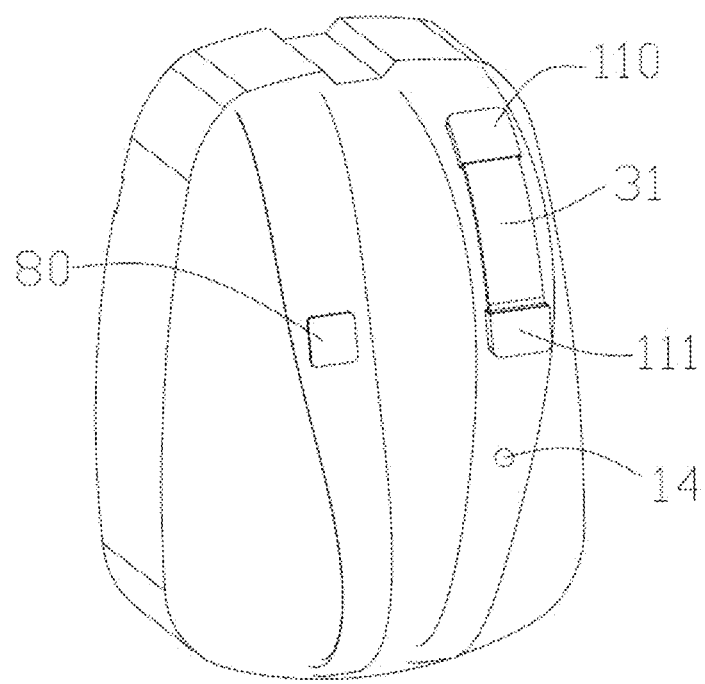
FIG. 5 is a perspective view of an electronic bag in accordance with another embodiment of the present disclosure, illustrating a strap of the electronic bag being provided with pockets for receiving a touch unit and another strap of the electronic bag being provided with a battery unit.
Figure 6:
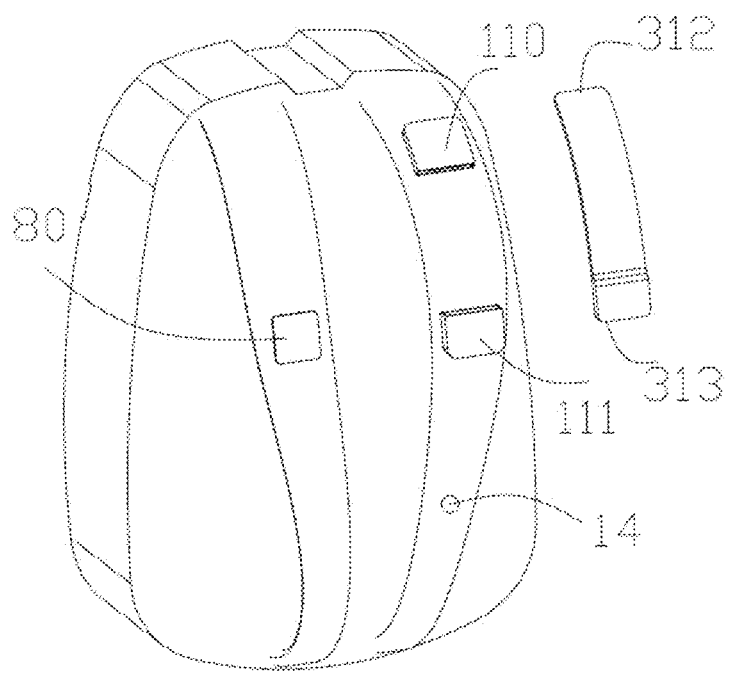
FIG. 6 is a partial, exploded perspective view of the electronic bag of FIG. 5.

As illustrated in FIGS. 5-6, the touch unit 31 is detachably connected to the strap 11 in a manner different from that described above. In the implementation, the strap 11 is provided with two pockets 110 and 111. The touch unit 31 has two opposite ends 312 and 313. The shape of the pocket 110 is adapted to that of the end 312, and the shape of the pocket 111 is adapted to that of the end 313, such that the ends 312 and 313 can be received in the pockets 110 and 111, respectively. Thus, the touch unit 31 can be detachably connected to the strap 11.

What needs to be further illustrated is that the above just illustrates several manners in which the touch unit 31 is detachably connected to the strap 11, and the touch unit 31 can be detachably connected to the strap 11 in other manners, such as using fixing elements (e.g., a clip) to attach the touch unit 31 to the strap 11, and the present disclosure is not limited thereto. It is to be understood that the touch unit 31 can be detachably connected to other positions for example the back surface of the electronic bag 100 in any of the above manners.

Furthermore, an indicator 14 is mounted on the strap 11. When the processor 60 of the electronic bag 100 receives a notification signal such as a calling, a message, an alarm or the like from the external device 200, the indicator 14 is controlled by the processor 60 to lighten. Different notification signals may correspond to different color of the light of the indicator 14. For example, green light is indicative of an incoming calling, yellow light is indicative of a message, and blue light is indicative of an alarm.

Figure 7:
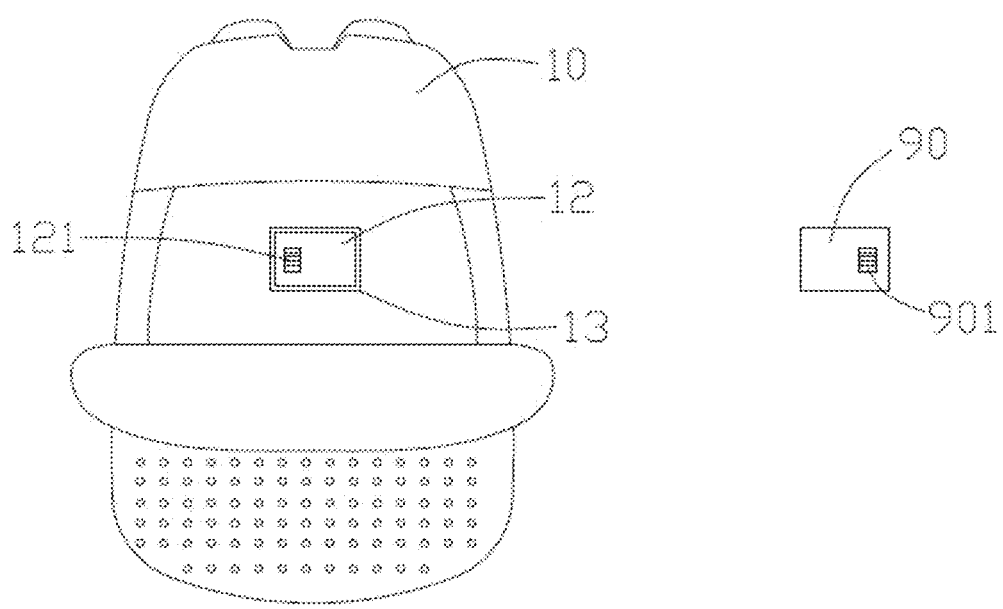
FIG. 7 is a front view of an electronic bag in accordance with another embodiment of the present disclosure, illustrating a connector being exposed outside when the electronic device is open and a box being able to be electrically coupled to the connector.

As illustrated in FIG. 7, a box 90 may be provided. The processor 60, the memory 70, the communication unit 50, and the battery unit 80 may be integrated within the box 90. The touch unit 31 may be attached on the strap 11. An inner space of the bag body 10 is provided with a connector 12, and the box 90 may be coupled with the connector 12. The inner space of the bag body 10 may receive various objects, such as books, foods, electronic devices, clothes, equipment, toys, bottles or the like. The inner space may be accessed when a part of the bag body 10 is separated from a remaining part of the bag body 10 by pulling a zipper between the part and the remaining part of the bag body 10. The connector 12 may be fixed to an inner wall of the inner space of the bag body 10 adjacent to the strap 11. The box 90 may have some pins 901 exposed outside and electrically connected to the processor 60, the memory 70, the communication unit 50, and the battery unit 80. The connector 12 also forms some pins 121 electrically connected to the touch unit 31 via wires or the like. When the box 90 is connected to the connector 12, the pins 901 of the box 90 contact the pins 121 of the connector 12. Thus, the box 90 is electrically connected to the touch unit 31. The box 90 may be detachably connected to the connector 12 such that the box 90 may be removed from the connector 12 to be charged. In an embodiment, a groove 13 is defined in the inner wall of the bag body 10 adjacent to the strap 11. The connector 12 may be received in the groove 13 to be embedded within the inner face of the bag body 10. The box 90 may also be received in the groove 13 to cover and connect the connector 12. Preferably, the box 90 may be fittingly received in the groove 13 to be fixed to the bag body 10. Alternatively, the box 90 may also be fixed to the connector 12 via magnetic force, locking device, screw or the like. The box 90 may be accessible when the bag body 10 is open, and covered when the bag body 10 is closed.

Figure 8:
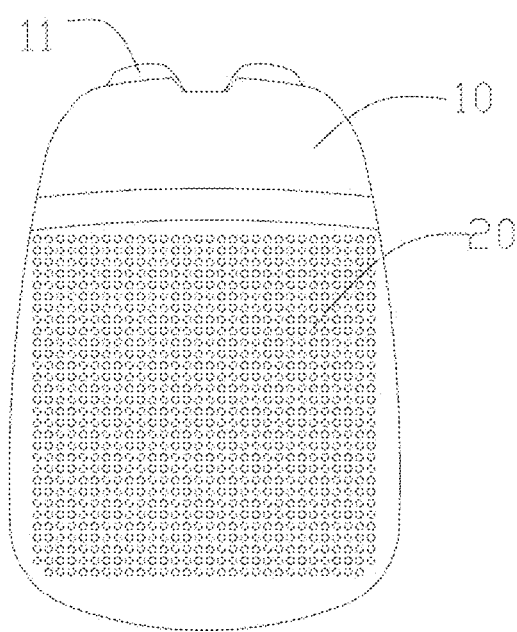
FIG. 8 is a front view of an electronic bag in accordance with yet another embodiment of the present disclosure, illustrating a display unit arranged on a front surface of the electronic bag.

Referring to FIG. 8, in an embodiment, the electronic bag 100 includes a display unit 20 arranged on the main body. In an implementation, when the communication between the electronic bag 100 and the external device 200 is established, the touch gesture on the touch unit 31 is used to control the external device 200, and when the communication between the electronic bag 100 and the external device 200 is disconnected, the touch gesture on the touch unit 31 is used to control content display of the display device 20. In an alternative implementation, no matter whether the communication between the electronic bag 100 and external device 200 is established, some particular touch gestures on the touch unit 31 are used to control content display of the display unit 20. For example, drawing a triangle on the touch unit 31 is to trigger the display unit 20 to display a stop sign such as a triangle containing "stop".

In an implementation, a mapping relationship between touch gestures and patterns is stored in the memory 70 in advance. In the relationship, each touch gesture corresponds to an identifier of a pattern, for example, an identifier "right"

indicates a right turn sign, and an identifier "left" indicates a left turn sign, and in the relationship, the touch gesture of sliding towards right corresponds to the identifier "right", and the touch gesture of sliding towards left corresponds to the identifier "left", and so on. The processor 60 is operable to control the display device 20 to display a pattern according to the touch gesture on the touch unit 31 and the relationship. For example, when the user slides towards right on the touch unit 31, the right turn sign is displayed on the display unit 20. In an alternative embodiment, many preset patterns are stored in the memory 70 beforehand. Each preset pattern corresponds to one touch gesture. When the touch gesture meets a predetermined touch gesture, a corresponding preset pattern is displayed. For example, when the user slides downwardly on the touch unit 31, the stop sign such as a triangle containing "stop" therein is displayed on the display unit 20, and when the user slides upwardly on the touch unit 31, an acceleration sign such as a circle containing "acceleration" therein is displayed on the display unit 20. In yet another implementation, the processor 60 controls the display unit 20 to display a pattern according to a trace of the touch gesture. For example, when the user writes "stop" on the touch unit 31, "stop" is displayed on the display device 20. That is to say, the displayed pattern is the same as or similar to the trace of the touch gesture. A rightwardly sliding gesture on the touch unit 31 results in a rightwardly sliding line displayed on the display unit 20, rather than the right turn sign.

In the embodiment, the display unit 20 is arranged on the front surface of the bag body 10, that is, the display unit 20 is arranged opposite the strap 11. In an alternative embodiment, the display unit 20 can be arranged on the side surface of the bag body 10, adjacent to the strap 11. An area of the touch unit 31 may be smaller than that of the display unit 20.

In the embodiment, the display unit 20 may be a display unit having a light emitting diode (LED) lattice screen or a flexible display unit such as an organic light emitting display (OLED).

In the embodiment, the display unit 20 is substantially rectangular. In an alternative embodiment, the display unit 20 may be a display unit in arbitrary shape, for example, a round display unit, an elongated display unit, or an irregular display unit.

Figure 9:
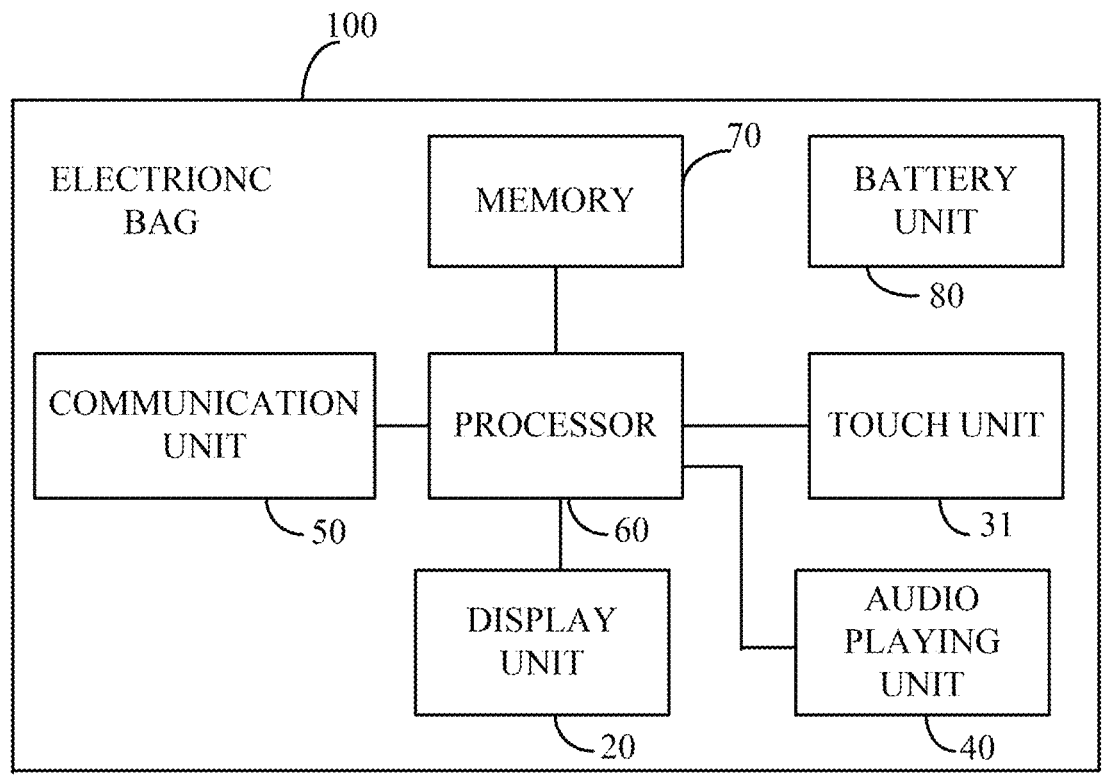
FIG. 9 is a block diagram illustrating the electronic bag of FIG. 8.

Referring to FIG. 9, in an embodiment, the electronic bag 100 may further include an audio playing unit 40. The audio playing unit 40 may be arranged on the bottom surface of the electronic bag 100. The audio playing unit 40 may have a speaker to output audio signals. The touch gesture on the touch unit 31 can be used to control playback of audio signals. In an implementation, when the communication between the electronic bag 100 and the external device 200 is established, the touch gesture on the touch unit 31 is used to control the external device 200, and when the communication between the electronic bag 100 and the external device 200 is disconnected, some touch gestures on the touch unit 31 is used to control audio signal playback of the audio playing unit 40. In an alternative implementation, no matter whether the communication between the electronic bag 100 and external device 200 is established, some particular touch gestures on the touch unit 31 are used to control audio signal playback of the audio playing unit 40. For example, writing M on the touch unit 31 is to trigger the audio playing unit 40 to play songs. The battery unit 80 can also supply power to the audio playing unit 40.

In the embodiment, operations for controlling the audio playing unit 40 (hereinafter, referred to as audio control operations for simplification) may be performed. When the processor 60 determines an audio control operation is performed, the processor 60 generates an audio control instruction according to the audio control operation, and transmits the audio control instruction to the audio playing unit 40 to control the audio playing unit 40. What needs to be illustrated is that the display unit 20 may also receive the audio control instruction, but the display unit 20 does not respond to the audio control instruction since the audio control instruction is just for controlling the audio playing unit 40. The audio control operations may be operations on a particular region (regions) of the touch unit 31 such as sliding towards right or left on any corner of the touch unit 31. For example, when the user slides towards left or right on one corner of the touch unit 31, the audio playing unit 40 is controlled to switch to the previous or next song. Certainly, different gestures may be preset to realize different functions.

In the embodiment, by arranging the audio playing unit 40, the electronic bag 100 can play audio signals.

Figure 11:
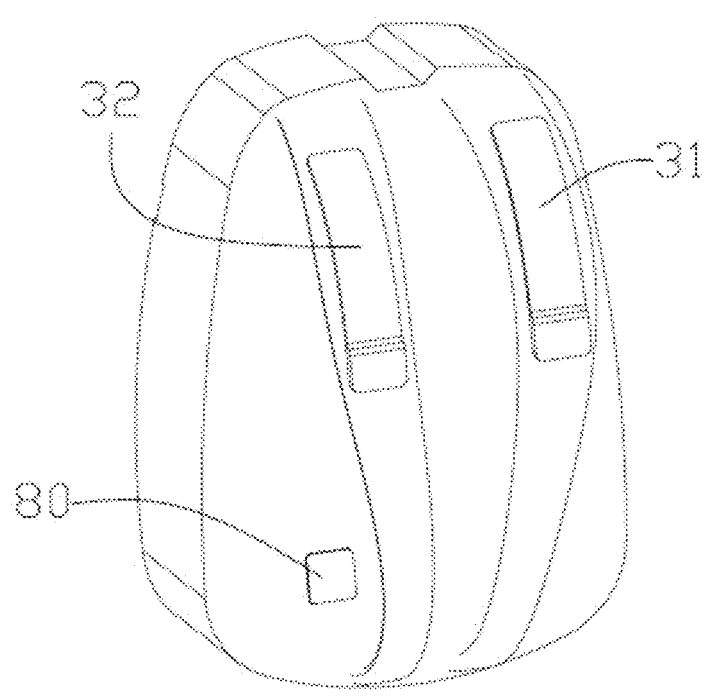
FIG. 11 is a perspective view of an electronic bag in accordance with further yet another embodiment of the present disclosure, illustrating two touch units being arranged on two straps of the electronic bag respectively, and a battery unit being arranged on a back surface of the electronic bag.

Referring to FIG. 11, in an alternative embodiment, the electronic bag 100 further includes another touch unit 32. Touch gestures on the touch unit 32 are used to control content display of the display unit 20 and audio signal playback of the audio playing unit 40. That is, the touch unit 31 can be set to merely control the external device 200, and the touch unit 32 can be set to merely control the display unit 20 and the audio playing unit 40. The structure of the touch unit 32 is the same as that of the touch unit 31, and unnecessary details will not be described herein.

In the embodiment, the touch unit 31 and the touch unit 32 are arranged on the two straps 11 of the electronic bag 100, respectively. In this case, the battery unit 80 can be arranged on the back surface of the electronic bag 100. In an alternative embodiment, the touch unit 32 and the touch unit 31 can be both arranged on one strap 11. The touch unit 32 may be detachably connected to the strap 11 in any of the above described manners, or may be fixed to the strap 11.

In an alternative embodiment, the electronic bag 100 may include more display units and more touch units. Besides the touch unit operable to control the external device 200, the remaining touch units and the display units are in one-to-one communication relationship, that is, one touch unit is operable to control one display unit. Among the touch units, at least one of the touch units is detachably connected to the strap of the electronic bag 100, and the remaining touch units are fixed to the bag body and the strap of the electronic bag 100. Alternatively, all the touch units are detachably connected to the bag body and the strap of the electronic bag 100.

When the electronic bag 100 includes multiple display units, different display units may have different functions. For example, if the electronic bag 100 includes two display units, one display unit is arranged on the front surface of electronic bag 100 for displaying indication signs such as the right turn sign, the stop sign, and so on, and another display unit is arranged on the side surface of the electronic bag 100 for displaying some images for example an image of a star to decorate the electronic bag 100. Certainly, the display units may have the same function, for example, all the display units are controlled to display the indication signs, and the user can select to control one display unit to display the indication signs according to actual usage.

The foregoing descriptions are merely preferred embodiments of the present disclosure, rather than limiting the present disclosure. Any modification, equivalent substitution, improvement or the like made within the spirit and principle of the present disclosure shall fall into the protection scope of the present disclosure.

What is claimed is:

1. An electronic bag comprising:
a communication unit operable to establish a communication connection between the electronic bag and an electronic device;
a touch unit operable to receive a touch gesture on the touch unit;
a processor operable to generate, according to the touch gesture on the touch unit, a control signal for controlling the electronic device;
a box;
a battery unit, wherein the battery unit is received in the box; and
a bag body and a strap connected to the bag body, wherein the box is connected to the bag body, and the touch unit is connected to the strap.

2. The electronic bag of claim 1, wherein the processor is operable to generate, according to the touch gesture on the touch unit and a currently running application of the electronic device, the control signal for controlling the electronic device.

3. The electronic bag of claim 2, wherein the processor is operable to determine the currently running application of the electronic device via a bidirectional communication between the electronic bag and the electronic device.

4. The electronic bag of claim 2, wherein the processor is operable to determine the currently running application of the electronic device according to an indication indicative of the currently running application of the electronic device transmitted by the electronic device.

5. The electronic bag of claim 1, wherein the processor is operable to generate the control signal according to the touch gesture on the touch unit and a correspondence between touch gestures and to-be-controlled functions of the electronic device.

6. The electronic bag of claim 1, wherein the electronic device is controlled to perform a predetermined function according to the touch gesture performed on the touch unit and a preset correspondence relationship between touch gestures and functions.

7. The electronic bag of claim 1, wherein the electronic device is operable to select a function stored in the electronic device beforehand according to the control signal and perform the function selected.

8. The electronic bag of claim 1, wherein the control signal is transmitted to another processor of the electronic device through the communication unit, and the another processor controls the electronic device to perform a function according to the control signal and a correspondence relationship between control signals and functions.

9. The electronic bag of claim 1, wherein the processor and the communication unit are both received in the box.

10. The electronic bag of claim 1, wherein the box is detachably connected to the electronic bag, and the touch unit is fixedly connected to the electronic bag.

11. The electronic bag of claim 1, wherein the bag body defines an inner space, and the box is mounted to an inner wall of the inner space.

12. The electronic bag of claim 11, wherein the box is exposed and accessible when the bag body is open, and the box is covered when the bag body is closed.

13. The electronic bag of claim 11, wherein the electronic bag further comprises a connector fixed to the bag body and electrically connected to the touch unit, when the box is connected to the connector, the box is electrically connected to the touch unit through the connector, and when the box is separated from the connector, the touch unit is powered off.

14. The electronic bag of claim 13, wherein the connector comprises a plurality of first pins exposed within the inner space, the box comprises a plurality of second pins, when the box is connected to the connector, the second pins contact the first pins to be electrically connected, and when the box is separated from the connector, the second pins are separated from the first pins to be electrically disconnected.

15. The electronic bag of claim 1, wherein the electronic device is an external device outside the electronic bag.

16. A wearable equipment comprising:
a main body;
a module connected to the main body, operable to establish a communication between the wearable equipment and an electronic device, and generate a control signal for controlling the electronic device when receiving a touch gesture;
a box;
a battery unit, wherein the battery unit is received in the box; and
a bag body and a strap connected to the bag body, wherein the box is connected to the bag body, and the touch unit is connected to the strap.

17. The wearable equipment of claim 16, wherein the module comprises a touch unit fixed to the main body, the box is detachably connected to the main body, the box receives a processor, a communication unit and a battery unit therein, when the box is connected to the main body, the touch unit is powered by the box, and when the box is removed from the main body, the touch unit is powered off.

18. The wearable equipment of claim 16, wherein the electronic device is controlled to perform a function according to a correspondence between touch gestures and to-be-controlled functions of the electronic device.

19. An electronic bag comprising:
a communication unit operable to establish a communication connection between the electronic bag and an electronic device;
a touch unit operable to receive a touch gesture on the touch unit; and
a processor operable to generate, according to the touch gesture on the touch unit and a currently running application of the electronic device, a control signal for controlling the electronic device.

* * * * *